May 28, 1940.　　　　G. W. ROUND　　　　2,202,319
SKID-CHAIN LINK
Filed June 20, 1939
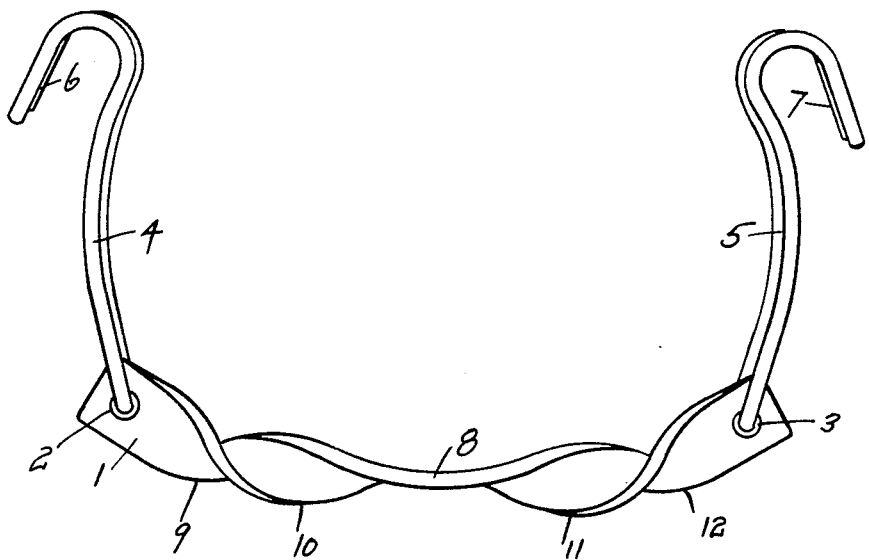
George W. Round
INVENTOR
BY W. B. Harpman
ATTORNEY

UNITED STATES PATENT OFFICE 2,202,319

SKID-CHAIN LINK

George W. Round, Deerfield, Ohio

Application June 20, 1939, Serial No. 280,088

2 Claims. (Cl. 152—226)

This invention relates to an anti-skid chain cross link.

The principal object of this invention is the provision of a cross link for anti-skid chains so formed that the same will have considerably longer life than the forms of cross links heretofore known to the art.

A further object of this invention is the provision of an anti-skid chain cross link formed of a single piece of twisted metal bar; the ground engaging surfaces of which provide excellent frictional contact when used in mud, or on snow or ice.

A still further object of this invention is the provision of an anti-skid chain cross link so formed that it can be used to replace the cross links of existing anti-skid chains without altering the remainder of the chain in any way.

A still further object of this invention is the provision of an anti-skid chain cross link so formed that it presents a relatively smooth surface to the tire upon which it is used.

The anti-skid chain cross link shown and described herein has been designed to form a more efficient cross link than has heretofore been known to the art. One of the major objections to the multiple link chain cross link is the fact that the various links wear out rapidly and upon breakage often puncture the tire and tube, as the multiple chain links when worn to the breaking point take on a form similar to a sharpened staple. Another disadvantage of the multiple link chain cross link is its unusually short life. It has been found that they are extremely impractical when used upon wet or dry pavements as the resultant friction soon wears out the individual links with the resultant breakage of the cross link. This relatively short life results in an unusually high upkeep cost if the anti-skid chains are to be maintained at full efficiency.

The anti-skid chain link shown and described herein overcomes these objections in a very satisfactory manner. Its ground engaging member being formed of a single section of steel bar so twisted and shaped that in normal use, it can wear more than three-quarters thru before there is any danger of breakage. Obviously this lengthens the life of the anti-skid chain cross links considerably. The parts are so formed that when the anti-skid chain cross link does wear thru there are no sharp pointed parts thrown off to puncture the tire. The cross link in the form of a twisted steel bar provides more traction in snow or mud and is highly effective when used upon ice as it creates in effect a series of cleats across the tire surface.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein:

The figure is a perspective view of the improved cross link and shows in detail the unique curvature thereof.

By referring to the drawing, it will be seen that the invention comprises an anti-skid chain cross link formed in three parts. The numeral 1 indicates a twisted steel bar adapted to form the ground engaging portion of the anti-skid chain cross link. This portion 1 of the device is provided with openings 2 and 3 at its ends and is adapted to be positioned on an anti-skid chain by means of connecting arms 4 and 5, preferably formed of wire, passed thru the openings 2 and 3 and provided with hook shaped upper ends 6 and 7 which are in turn adapted to engage the annular supporting chains of the anti-skid chain.

The invention resides in the formation and shape of the ground engaging portion 1 of the cross link. This twisted steel bar being formed as shown with a one and one-half twist in each half of the same in relation to a central point 8. These twists form four flange-like edges, 9, 10, 11 and 12 which provide excellent traction on the ground. At the same time the formation of the twisted steel bar provides a relatively flattened upper surface upon which the tire rests due to a slight upturning of the end sections of the same in relation to a center point thereof. It will be seen by referring to the drawing, that the right half of this twisted steel bar is twisted from the center point 8 thereof with a reverse twist in relation to the left half of the same. This is highly important to the successful formation of this anti-skid chain cross link as it provides the relatively flat upper section upon which the tire rests.

It will be seen that in order to enable existing tire chains to be equipped with this improved form of cross link, it is only necessary that the existing chain linkage be removed, and a plurality of the improved cross links positioned between the annular supporting chains by means of the connecting arms 4 and 5 and their hook shaped ends 6 and 7. It is obvious that these hook shaped ends 6 and 7 can be bent together after they are inserted thru the annular supporting chains of the anti-skid set so that the cross link becomes in effect an actual part of the complete anti-skid chain.

It has been determined that due to the efficiency of this twisted steel bar cross link fewer of the cross links may be used, if desired, with resulting economy to the purchaser. In this respect, these twisted steel bar cross links can be manufactured cheaply and sold at a relatively low price; it being obvious that they will wear considerably longer and offer considerably more resistance when used in mud or upon ice or snow than the older forms of cross links.

What I claim is:

1. An anti-skid chain cross link comprising a bar of twisted steel the center section of which is flat in relation to the tire upon which it is used, the end sections thereof each being twisted so as to form a plurality of road engaging flanges of the said twisted steel bar, openings in the ends of the said twisted steel bar, connecting arms engaging the said openings and adapted to be connected to the annular supporting side chains of an anti-skid chain set, so as to form a cross link the tire engaging surfaces of which are relatively flat and convexly shaped in relation thereto.

2. An anti-skid chain cross link comprising a twisted steel bar, the center section of which is flat in relation to the tire upon which it is used, one end of the said steel bar being twisted one and one-half turns in relation to the said flat center section and the other end of the said steel bar being reversely twisted one and one-half turns in relation to the opposite end thereof, so as to form a cross link the tire engaging portion of which is relatively flat, openings formed in the end sections of the twisted steel bar, connecting arms positioned in the said openings and adapted to engage the annular supporting side chains of an anti-skid chain set.

GEORGE W. ROUND.